United States Patent
Carbone et al.

(10) Patent No.: US 10,577,122 B2
(45) Date of Patent: Mar. 3, 2020

(54) SLAT DISCONNECT SENSOR

(71) Applicant: HAMILTON SUNDSTRAND CORPORATION, Windsor Locks, CT (US)

(72) Inventors: Michael Carbone, Rockford, IL (US); Joseph M. Bielefeldt, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 363 days.

(21) Appl. No.: 15/195,550

(22) Filed: Jun. 28, 2016

(65) Prior Publication Data

US 2017/0369182 A1    Dec. 28, 2017

(51) Int. Cl.
*G01B 7/30* (2006.01)
*B64D 45/00* (2006.01)
*G01D 5/165* (2006.01)

(52) U.S. Cl.
CPC ........... *B64D 45/0005* (2013.01); *G01B 7/30* (2013.01); *B64D 2045/001* (2013.01); *G01D 5/165* (2013.01)

(58) Field of Classification Search
CPC .......... B64D 45/0005; B64D 2045/001; G01B 7/30; G01D 5/165
USPC ................................................. 324/550, 71.1
See application file for complete search history.

(56) References Cited

U.S. PATENT DOCUMENTS

| | | | |
|---|---|---|---|
| 3,729,603 A | 4/1973 | Foltz | |
| 4,187,923 A | 2/1980 | McClure, III et al. | |
| 5,651,513 A * | 7/1997 | Arena | B64C 9/04 244/215 |
| 6,373,006 B1 | 4/2002 | Toki | |
| 6,483,436 B1 | 11/2002 | Emaci et al. | |
| 7,549,605 B2 * | 6/2009 | Hanlon | B64C 13/503 244/213 |
| 7,883,059 B2 | 2/2011 | Kunz | |
| 7,921,729 B2 | 4/2011 | Conner et al. | |
| 7,945,425 B2 * | 5/2011 | Marx | B64D 45/0005 244/213 |
| 8,516,898 B2 | 8/2013 | Mayer et al. | |
| 8,820,174 B2 | 9/2014 | Carbone et al. | |
| 9,102,418 B2 | 8/2015 | Carbone | |
| 2004/0036477 A1 | 2/2004 | Schievelbusch et al. | |
| 2012/0091693 A1 * | 4/2012 | Smith | A63C 5/02 280/603 |
| 2016/0103027 A1 | 4/2016 | Davies et al. | |

FOREIGN PATENT DOCUMENTS

EP    3025966 A1    6/2016

OTHER PUBLICATIONS

Extended European Search Report issued in EP Application No. 17178358.2 dated Nov. 23, 2017, 10 pages.

* cited by examiner

*Primary Examiner* — Jeff W Natalini
(74) *Attorney, Agent, or Firm* — Cantor Colburn LLP

(57) ABSTRACT

A sensor for detecting relative movement between two adjacent components includes a first member, a second member rotatable about an axis relative to the first member, and a fuse element including a first electrical contactor connected to the first member and a second electrical contactor connected to the second member. When the first member and the second member are skewed, the first electrical contactor and the second electrical contactor are not in electrical contact.

20 Claims, 7 Drawing Sheets

SLAT DISCONNECT SENSOR

BACKGROUND OF THE INVENTION

The subject matter disclosed herein relates to a sensor that detects skewed or disconnected adjacent movable components, and more particularly, to a sensor that detects skewed or disconnected aircraft control surface such as slats or flaps.

Aircraft wings may employ lift changing devices that are often referred to as auxiliary airfoils or control surfaces. When extended, the surfaces increase the effective size, curvature, camber, and area of the wing thereby increasing the lift provided by the wing. During takeoff and landing of the aircraft, a pilot can extend these control surfaces from a leading or a trailing edge of a wing. Control surfaces that extend from the leading edge of the wing are referred to as slats, while control surfaces that extend from the trailing edge of the wing are referred to as flaps. Slats are used primarily to increase lift at large angles of attack (e.g., take off), while flaps are designed primarily to increase lift during landing.

An actuation system is used to extend or retract the control surfaces. Typically, the actuation system moves the plurality of slats or flaps that form a control surface in unison. During an undesired condition, adjoining slats move relative to one another causing a loss of lift on the wing.

BRIEF DESCRIPTION OF THE INVENTION

According to one embodiment of the invention, a sensor for detecting relative movement between two adjacent components includes a first member, a second member rotatable about an axis relative to the first member, and a fuse element including a first electrical contactor connected to the first member and a second electrical contactor connected to the second member. When the first member and the second member are skewed, the first electrical contactor and the second electrical contactor are not in electrical contact.

According to another embodiment, a method of detecting skew between two adjacent components includes providing a first member having a first electrical contactor associated with a first component of the two adjacent components and providing a second member having a second electrical contactor associated with a second component of the two adjacent components. The first electrical contactor and the second electrical contactor are arranged in contact. Shearing the contact between the first electrical contactor and the second electrical contactor indicates a skewed condition between the two adjacent components.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
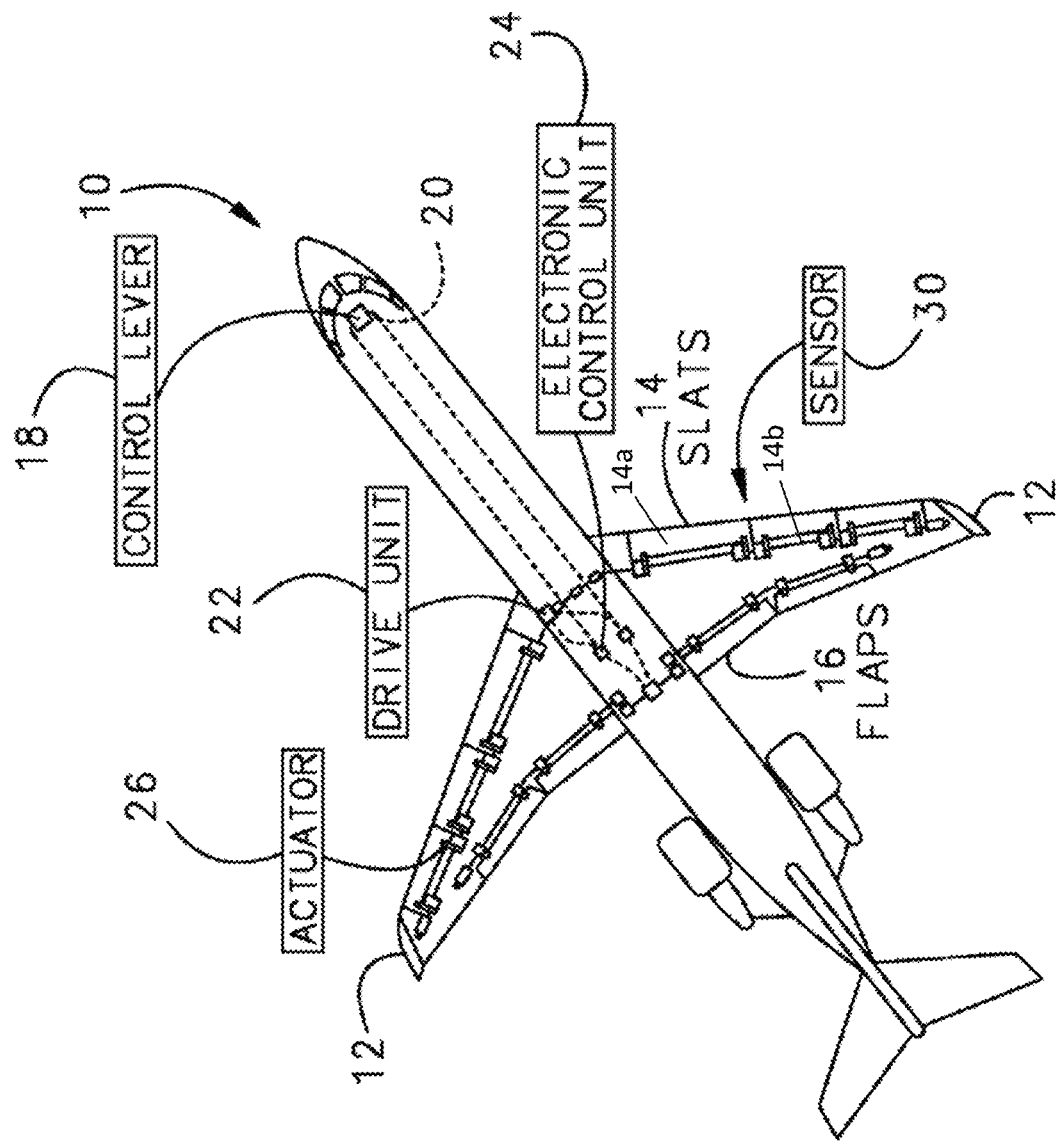
FIG. 1 is a schematic diagram of an aircraft.
Figure 2:
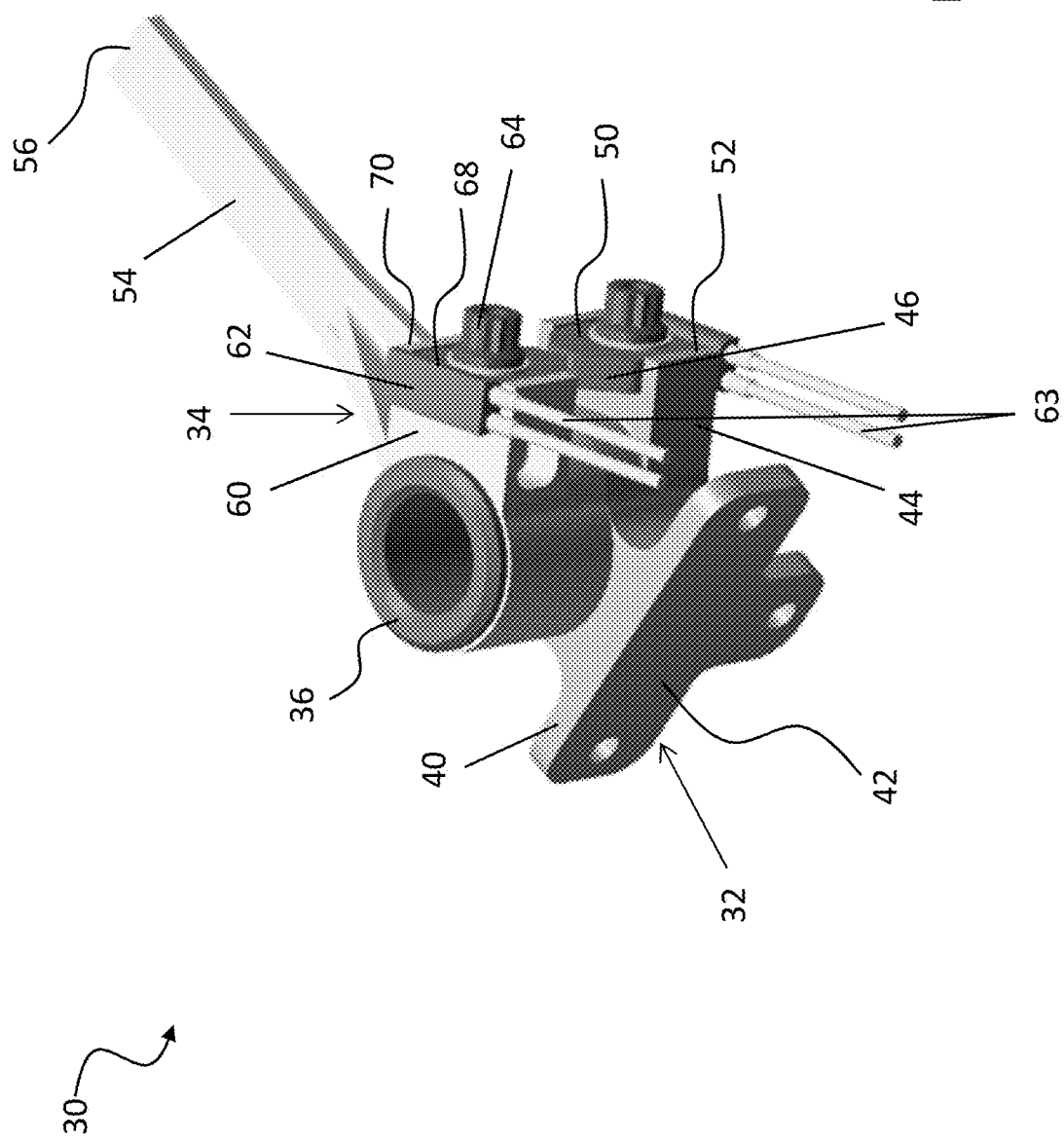
FIG. 2 is a perspective view of a sensor of the aircraft according to an embodiment.

Referring now to FIG. 1, a typical aircraft 10 having two wings 12 is illustrated. Each wing 12 has a plurality of control surfaces, such as slats 14 and flaps 16 for example. These control surfaces are movable to control the lift of the aircraft 10. In an embodiment, a control lever 18 for operating at least one of the slats 14 and the flaps 16 is located in a cockpit and is operable by a pilot of the aircraft. A drive unit 22 controlled by an electronic control unit 24 transmits a torque to a plurality of actuators 26 which may be used to drive the slats 14 and/or flaps 16. A sensor 30 is attached between adjacent control surfaces to detect relative movement between the adjacent control surfaces.

Figure 3A:
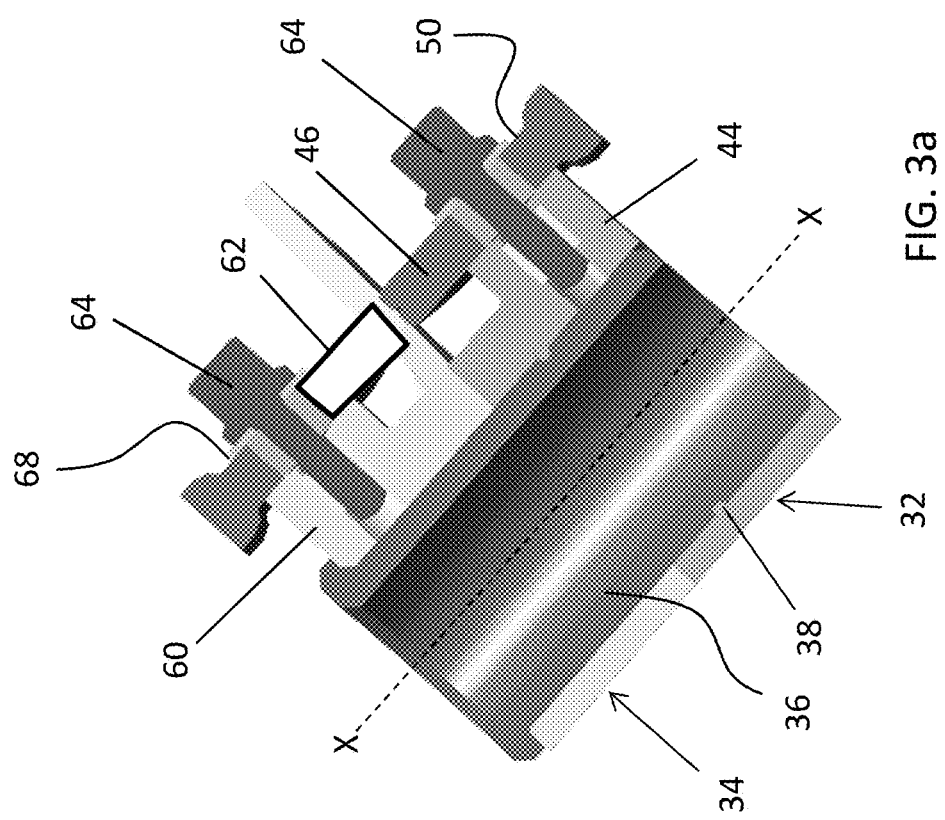
FIG. 3a is a cross-sectional view taken along line A-A of FIG. 3 according to an embodiment.
Figure 3:
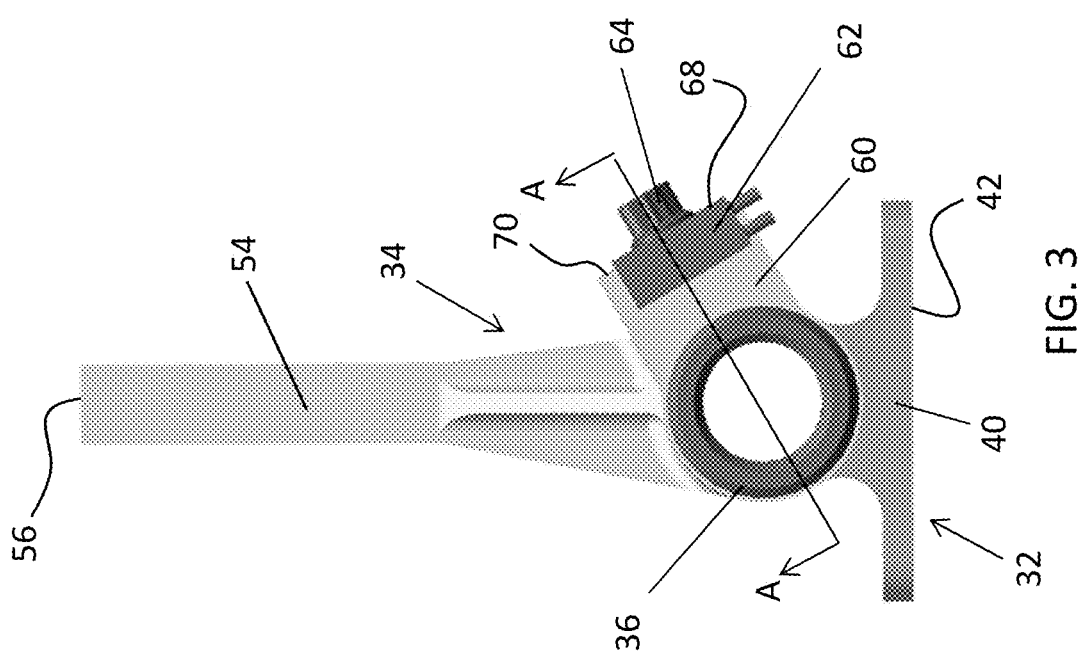
FIG. 3 is a top view of the sensor of FIG. 2 according to an embodiment.

With reference now to FIGS. 2-7, an example of the sensor 30 is illustrated in more detail. The sensor 30 includes a first member 32 that may be associated with a first component, such as a first slat 14a for example, and a second member 34 that may be associated with a second, adjacent component, such as a second slat 14b for example. In the illustrated, non-limiting embodiment, the first member 32 and the second member 34 are stacked vertically, one on top of the other; however, other configurations of the sensor 30, such as where the first member 32 and the second member 34 are stacked about a horizontal axis for example, are also within the scope of the disclosure. As illustrated, the first member 32 and the second member 34 are coupled together, such as with a pin or other fastener 36. In an embodiment, rotation of the first member 32 relative to an axis X defined by the pin 36 is restricted, such as by a retention wire 38 (FIG. 3a) positioned about a periphery of the pin 36 in alignment with the first member 32. However, it should be understood that other methods and component for restraining movement of the first member 32 relative to the axis X is contemplated herein. The second member 34 is configured to rotate about the axis X relative to both the pin 36 and the first member 32.

The first member 32 includes a flange or base 40 for mounting the member 32 to a first component. In the illustrated, non-limiting embodiment, the surface 42 of the base 40 configured to abut the first component is arranged generally parallel to the axis X defined by the pin 36. The first member 32 additionally includes a first connector 44 having at least one first electrical contactor 46, such as a fuse for example, removably mounted thereto. As shown, the first connector 44 extends at an angle to the base 40 and includes a cavity 48 within which the first fuse 46 is received. As a result, when the first fuse 46 is mounted to the first connector 44, a surface 50 of the first fuse 46 is generally flush with the distal end 52 of the first connector 44.

The second member 34 includes an elongated lever 54 configured to contact the second component. In an embodiment, the distal end 56 of the elongated lever 54 extends through an opening 58 formed in the second component (see FIG. 4). However, other types of connections are considered within the scope of the disclosure. The second member 34 includes a second connector 60 having at least one second electrical contactor 62, removably mounted thereto, such as with a fastener 64 for example. As shown, the second connector 60 is formed at an angle to the elongated lever 54. Similar to the first connector 44, the second connector 60 may include a cavity 66 within which the second electrical contactor 62 is positioned such a surface 68 of the second electrical contactor 62 is generally flush with the distal end 70 of the second connector 60. The second electrical contactor 62 may also be a fuse, and may be substantially identical, or different than the first electrical contactor 46. Each of the first electrical contactor 46 and the second electrical contactor 62 are connected to a power source (not shown) via one or more wires 63.

Figure 4:
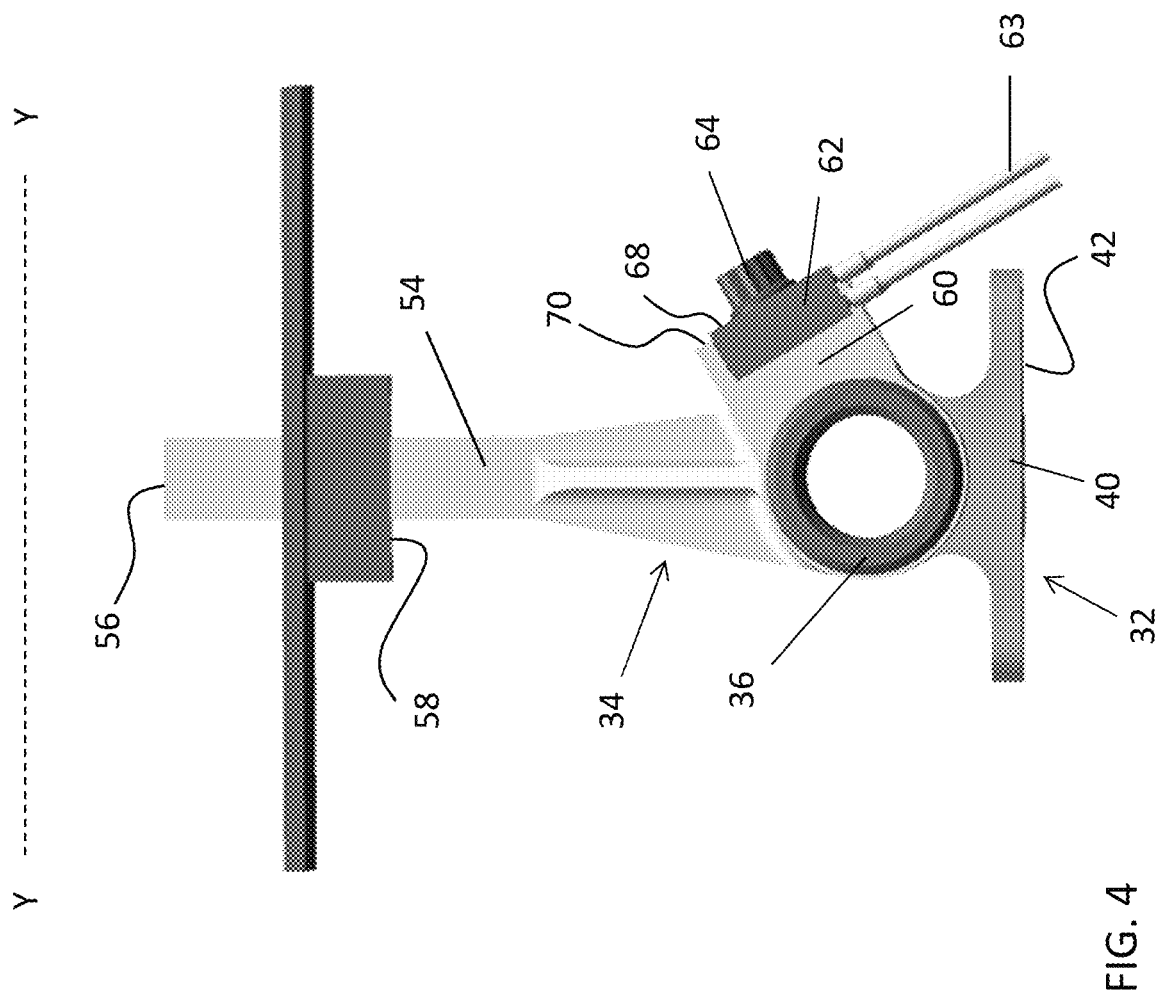
FIG. 4 is a top view of a sensor during normal operation conditions according to an embodiment.
Figure 5:
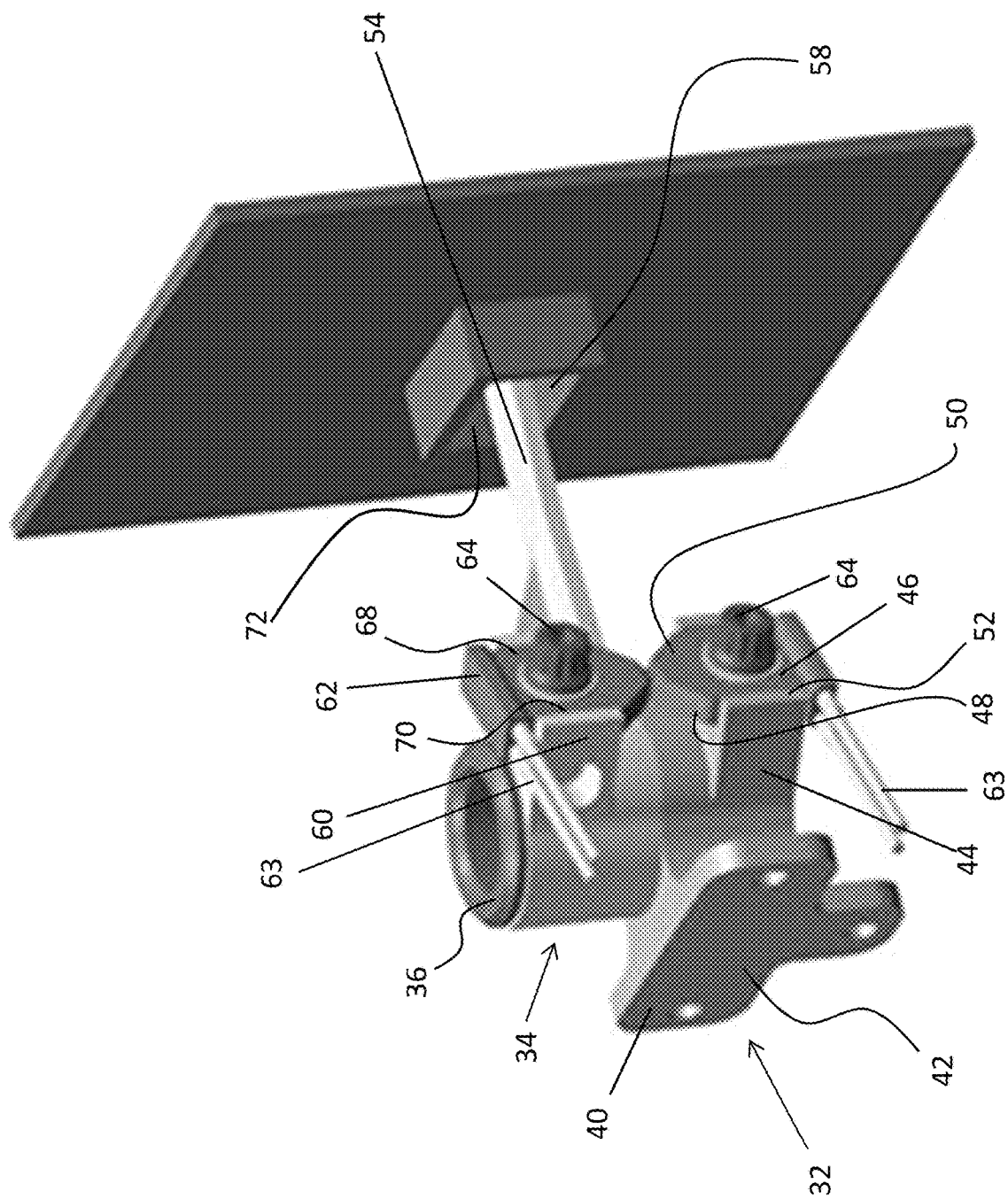
FIG. 5 is a perspective view of a sensor during normal operation conditions according to an embodiment.
Figure 6:
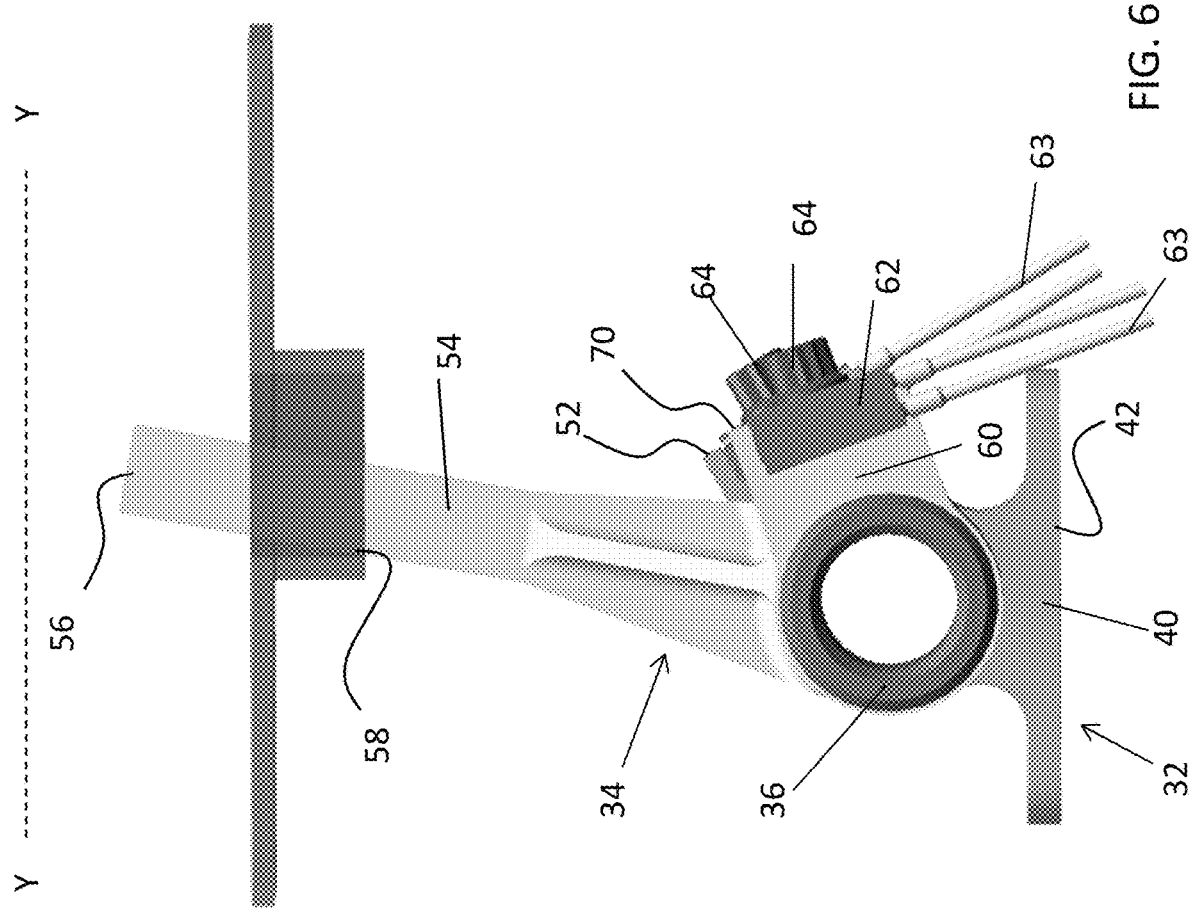
FIG. 6 is a top view of a sensor when a first component is skewed relative to a second component according to an embodiment.
Figure 7:
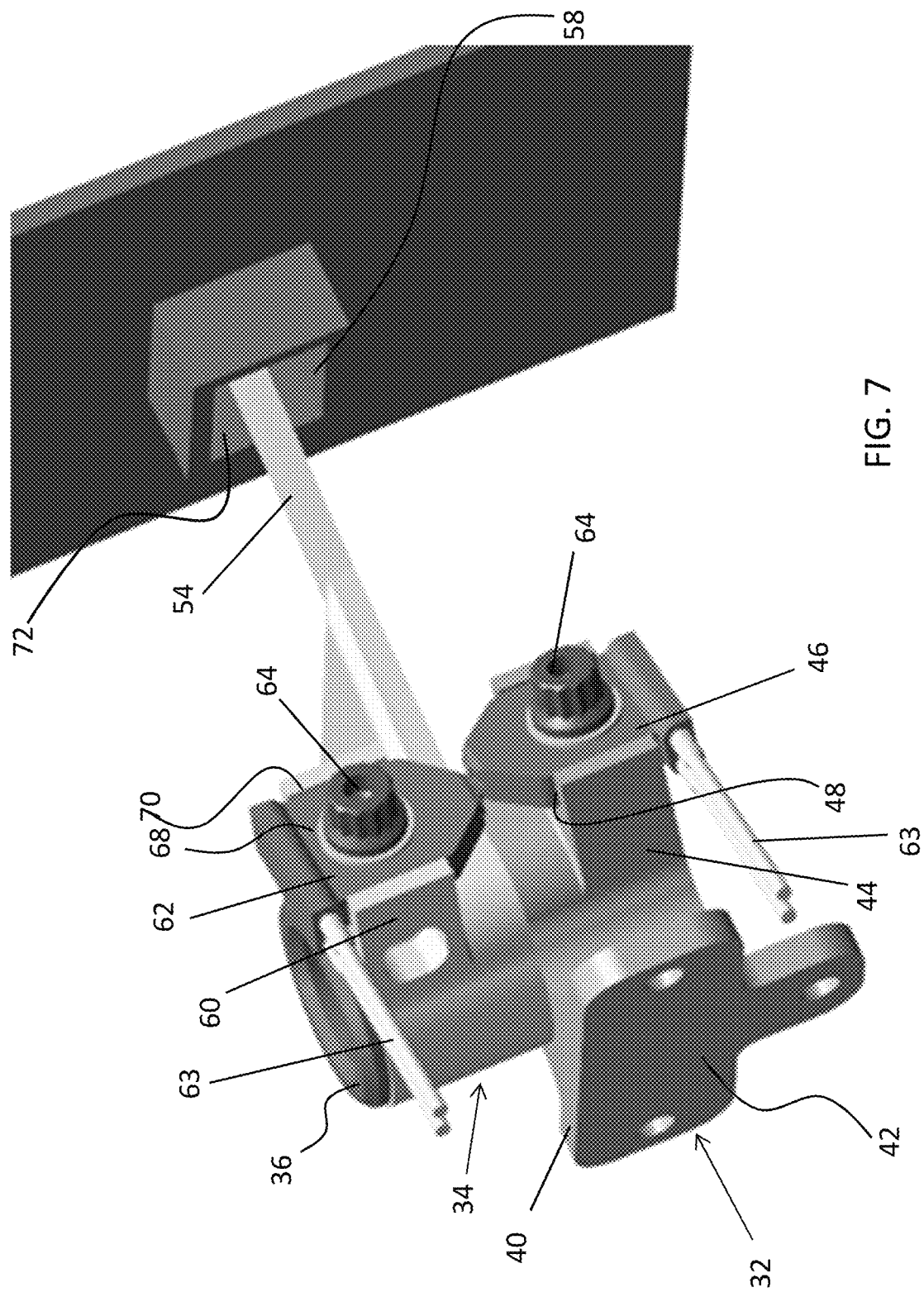
FIG. 7 is a perspective view of a sensor when a first component is skewed relative to a second component according to an embodiment.

When the first component and the second component are aligned, as shown in FIGS. 4 and 5, the elongate lever 54 of the second member 34 and the base 40 of the first member 32 are disposed opposite one another about the pin 36. In addition, the first connector 44 and the second connector 60 are aligned such that the first fuse 46 and the second fuse 62 are in electrical contact with one another. In the non-limiting embodiment of FIG. 5, the first connector includes two first fuses 46 arranged in an overlapping configuration and the second connector includes two second fuses 62 arranged in an overlapping configuration such that the stacked fuses 46, 62 provided two channel operation. As shown the front pair of fuses 46, 62 are in electrical contact, and the back pair of fuses 46, 62 are also in electrical contact.

During normal aligned conditions, the first component 14a and the second component 14b are configured to translate together along an axis Y parallel to the base 40 and the second component such that the lever 54 remains generally perpendicular to the axis Y. The opening 58 within which the elongated lever 54 extends is sized to allow a limited amount of motion between the first and second component. When the relative motion between the first component and the second component exceeds an allowable limit, the sidewall 72 of the opening 58 in the second component contacts the elongated lever 54 causing the second member 34 to rotate about the pin 36. This rotation of the second member 34 causes the second fuse 62 to shear relative to the first fuse 46, thereby interrupting the electrical contact there between and the signal being transmitted to a controller by the fuses 46, 62, indicating the existence of a skewed condition.

The sensor 30 illustrated and described herein has a reduced number of components, size, weight, and complexity compared to conventional sensors. As a result, the sensor is easier to implement and requires less maintenance over time. In addition, the sensor provides enhanced detected because the sensor is more sensitive than existing sensors and requires a reduced level of panel skew to detect a fracture.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sensor for detecting relative movement between two adjacent components comprising:
    a first member;
    a second member;
    an axis of rotation extending through the first member and the second member, the second member being rotatable about the axis relative to the first member; and
    a fuse element including a first electrical contactor connected to the first member and a second electrical contactor connected to the second member, the first electrical contactor and the second electrical contactor being stacked relative to one another along the axis of rotation, wherein when the first member and the second member are skewed about the axis of rotation, the first electrical contactor and the second electrical contactor are not in electrical contact such that the fuse element is electrically disconnected.

2. The sensor according to claim 1, further comprising one or more wires connected to each of the first electrical contactor and the second electrical contactor to provide power thereto.

3. The sensor according to claim 1, wherein when the first member and the second member are not skewed, the first electrical contactor and the second electrical contactor are in electrical contact.

4. The sensor according to claim 1, wherein a shearing force generated by rotation of the second member relative to the first member moves the second electrical contactor out of electrical contact with the first electrical contactor.

5. The sensor according to claim 1, wherein rotation of the first member about the axis is restricted by a retention wire.

6. The sensor according to claim 1, wherein the first electrical contactor and the second electrical contactor are fuses.

7. The sensor according to claim 1, wherein the first member and the second member are coupled together by a pin.

8. The sensor according to claim 1, wherein the first member includes a base for mounting to one of the two adjacent components.

9. The sensor according to claim 8, wherein the second member includes an elongated lever associated with another of the two adjacent components.

10. The sensor according to claim 9, wherein the elongated lever extends through an opening formed in the another component of the two adjacent components.

11. The sensor according to claim 10, wherein contact between a sidewall of the opening and the elongated lever causes the second member to rotate relative to the first member.

12. The sensor according to claim 10, wherein the opening is sized to allow limited movement between the two adjacent components without rotating the second member relative to the first member.

13. The sensor according to claim 1, wherein the first member includes a first connector extending at a first angle for supporting the first electrical contactor, and the second member includes a second connector extending at a second angle for supporting the second electrical contactor, the first connector and the second connector being substantially aligned.

14. The sensor according to claim 13, wherein the first connector includes a cavity within which the first electrical contactor is mounted and the second connector includes a cavity within which the second electrical contactor is mounted.

15. The sensor according to claim 1, wherein at least one of the two adjacent components is a control surface of an aircraft.

16. The sensor according to claim 15, wherein at least one of the two adjacent components is a slat of a wing of the aircraft.

17. A method of detecting skew between two adjacent components comprising:
   providing a first member having a first electrical contactor associated with a first component of the two adjacent components;
   providing a second member having a second electrical contactor associated with a second component of the two adjacent components, an axis of rotation extending through the first member and the second member, the first electrical contactor and the second electrical contactor being stacked relative to one another along the axis of rotation, the second member being rotatable about the axis of rotation relative to the first member, wherein the first electrical contactor and the second electrical contactor being arranged in contact; and
   shearing the contact between the first electrical contactor and the second electrical contactor to indicate a skewed condition between the two adjacent components.

18. The method according to claim 17, wherein shearing the contact between the first electrical contactor and the second electrical contactor occurs when the second member is rotated relative to the first member.

19. The method according to claim 18, wherein translation of the second component along an axis causes the second member to rotate relative to the first member.

20. The method according to claim 17, wherein shearing the contact between the first electrical contactor and the second electrical contactor interrupts a signal sent to a controller.

* * * * *